US008626418B2

(12) United States Patent
Boulet et al.

(10) Patent No.: US 8,626,418 B2
(45) Date of Patent: Jan. 7, 2014

(54) METHOD AND SYSTEM FOR MONITORING SPEED OF A VEHICLE

(75) Inventors: Bertrand Boulet, Montesson (FR); Francis Bredin, Maisons-Alfort (FR)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 12/095,532

(22) PCT Filed: Sep. 18, 2006

(86) PCT No.: PCT/EP2006/066455

§ 371 (c)(1), (2), (4) Date: Sep. 27, 2010

(87) PCT Pub. No.: WO2007/068512

PCT Pub. Date: Jun. 21, 2007

(65) Prior Publication Data

US 2011/0010042 A1 Jan. 13, 2011

(51) Int. Cl.
*G01C 21/32* (2006.01)

(52) U.S. Cl.
USPC ............. 701/96; 340/905; 180/170; 342/104; 342/118

(58) Field of Classification Search
USPC ................. 701/29, 33, 96; 340/905; 180/170; 342/104, 118
IPC .............. G06F 7/00; G01C 21/26; B60K 31/00
See application file for complete search history.

(56) References Cited

U.S. PATENT DOCUMENTS

| | | | | |
|---|---|---|---|---|
| 5,485,161 | A | 1/1996 | Vaughn | |
| 6,253,150 | B1 * | 6/2001 | Nakamura | 701/409 |
| 6,970,102 | B2 * | 11/2005 | Ciolli | 340/933 |
| 7,382,274 | B1 * | 6/2008 | Kermani et al. | 340/901 |
| 8,188,887 | B2 * | 5/2012 | Catten et al. | 340/905 |
| 2001/0007966 | A1 * | 7/2001 | Sielagoski et al. | 701/96 |
| 2002/0121398 | A1 * | 9/2002 | Kikuchi et al. | 180/169 |
| 2002/0126023 | A1 * | 9/2002 | Awada | 340/905 |
| 2002/0165657 | A1 * | 11/2002 | Winner et al. | 701/93 |
| 2003/0204300 | A1 * | 10/2003 | Adachi | 701/96 |
| 2004/0010362 | A1 * | 1/2004 | Michi et al. | 701/93 |
| 2004/0075582 | A1 | 4/2004 | Bergan et al. | |
| 2005/0143903 | A1 * | 6/2005 | Park et al. | 701/117 |
| 2007/0010941 | A1 * | 1/2007 | Marsh | 701/209 |
| 2007/0050130 | A1 * | 3/2007 | Grimm et al. | 701/208 |

* cited by examiner

*Primary Examiner* — Tuan C. To
(74) *Attorney, Agent, or Firm* — Schmeiser, Olsen & Watts, LLP; John Pivnichny

(57) ABSTRACT

A method and system for monitoring speed of a vehicle moving along a road that includes risk zones. The method determines: road conditions for each risk zone; a threshold speed of each risk zone based on the road conditions and on a distance to a posted speed limit within a high risk zone; a geographical position of the vehicle, a current risk zone in which the vehicle is moving based on the stored geographical position of the vehicle; and a current speed of the vehicle moving in the current risk zone which exceeds the threshold speed of a particular risk zone, resulting in performing a subsequent action (triggering an alarm within the vehicle, presenting a message to a driver in the vehicle, and/or automatically regulating the speed of the vehicle). The action is specific to the particular risk zone and dependent on the road conditions.

20 Claims, 4 Drawing Sheets

METHOD AND SYSTEM FOR MONITORING SPEED OF A VEHICLE

TECHNICAL FIELD OF THE INVENTION

The present invention relates generally to the field of vehicle speed regulation systems and, more particularly, to a method, system and program for auditing a vehicle speed compliance to an upcoming speed limit.

BACKGROUND ART

Speed limits and driving conditions along any given route may change frequently, particularly in urban settings. In addition, along a given route speed limits may change according to the time of day, such as during school hours or rush hours. The current and accepted method of informing the driver of the speed limit is through posted speed limit signs on the side of the road. However, it is easy for drivers to become distracted and not notice changes in speed limit sign postings. In addition, drivers may intentionally or unintentionally exceed the posted speed limit. Exceeding a posted speed limit can have negative consequences such as personal injury, property damage, and fines from speeding tickets. Moreover, when multiple speed limit signs are posted for a single section of road (e.g. a day speed limit and a night speed limit), a driver must determine which speed is applicable.

Several systems have been developed to warn drivers about exceeding the posted speed limit. Most of the current systems are based on the use of a Global Positioning System (GPS) receiver that determines the position of the vehicle and compares it to the posted speed limit by searching a centralised database. U.S. Pat. No. 6,515,596 from the Assignee is an example of such solutions and is incorporated by reference herein particularly for the description of the GPS communication protocol.

While such system provides alternative to posting speed limit signs, it is oriented as a reporting system and not as an reacting system to adjust the speed of the vehicle to the posted speed limit.

Adjusting the speed of a vehicle has been described for example in U.S. Pat. No. 6,462,675 from the Assignee by activating a speed controller. A driver may include a preference for a speed controller application to automatically govern the speed of the vehicle when excessive speeds are detected.

While this patent provides an additional feature of controlling a vehicle speed limit, such system is operating when a posted speed limit is exceeded.

However, there is no known solution to audit the behaviour of a driver to comply to an upcoming speed limit. Anticipation of an upcoming speed limit would leave him with the possibility to comply smoothly to the upcoming posted speed limit. Additional automatic adjusting of the speed would also be made in a progressive manner.

Therefore, in view of the foregoing, a need exists for a method, system and program for alerting a driver of upcoming speed limits and for adjusting the speed of the vehicle in case of non compliance to the warnings.

Moreover, it would be desirable that the cost of implementing such system would not be prohibitive. The present invention offers such low cost solution by working with the existing transportation infrastructure.

SUMMARY OF THE INVENTION

It is therefore an object of the present invention to provide a vehicle speed detection system.

It is another object of the present invention to provide a method, system, and program for auditing a driver behaviour to comply to upcoming speed limits.

It is yet another object of the present invention to provide a method, system and program for determining whether a vehicle's actual speed is within a current position-dependent speed limit range.

In accordance with the present invention, a position of a vehicle is detected by a receiver at the vehicle from a global positioning system. A risk level associated with the vehicle position as regard to the upcoming posted speed limit is determined from a centralised database. Specific warning and/or adjustment actions are activated depending on the risk level and the current speed of the vehicle.

All objects, features, and advantages of the present invention will become apparent in the following detailed written description.

According to the invention there is provided a system and method for auditing a driver compliance to upcoming speed limit as described in the appended independent Claims.

Further aspects of the invention are provided by the further embodiments described in the appended dependent Claims.

According to a first embodiment, a method for determining a vehicle speed compliance to an upcoming posted speed limit comprises the steps of:

- acquiring the current speed and the geographical position of the vehicle;
- assigning a risk level to the vehicle as regard to its distance to the upcoming posted speed limit;
- linking the assigned risk level to a threshold speed value, wherein the threshold value being dependent on road and traffic conditions;
- comparing the current speed of the vehicle to the threshold speed value; and
- generating an appropriate set of in-car actions according to the result of the comparing step.

According to a further aspect of the present invention, a computer program product stored on a medium readable by a computer machine is disclosed. The computer program product tangibly embodies readable program means for causing the computer machine to perform the method as described in the appended claims.

BRIEF DESCRIPTION OF THE DRAWINGS

Reference will now be made, by way of example, to the accompanying drawings in which.

DETAILED DESCRIPTION OF THE PREFERRED EMBODIMENT

Figure 1:
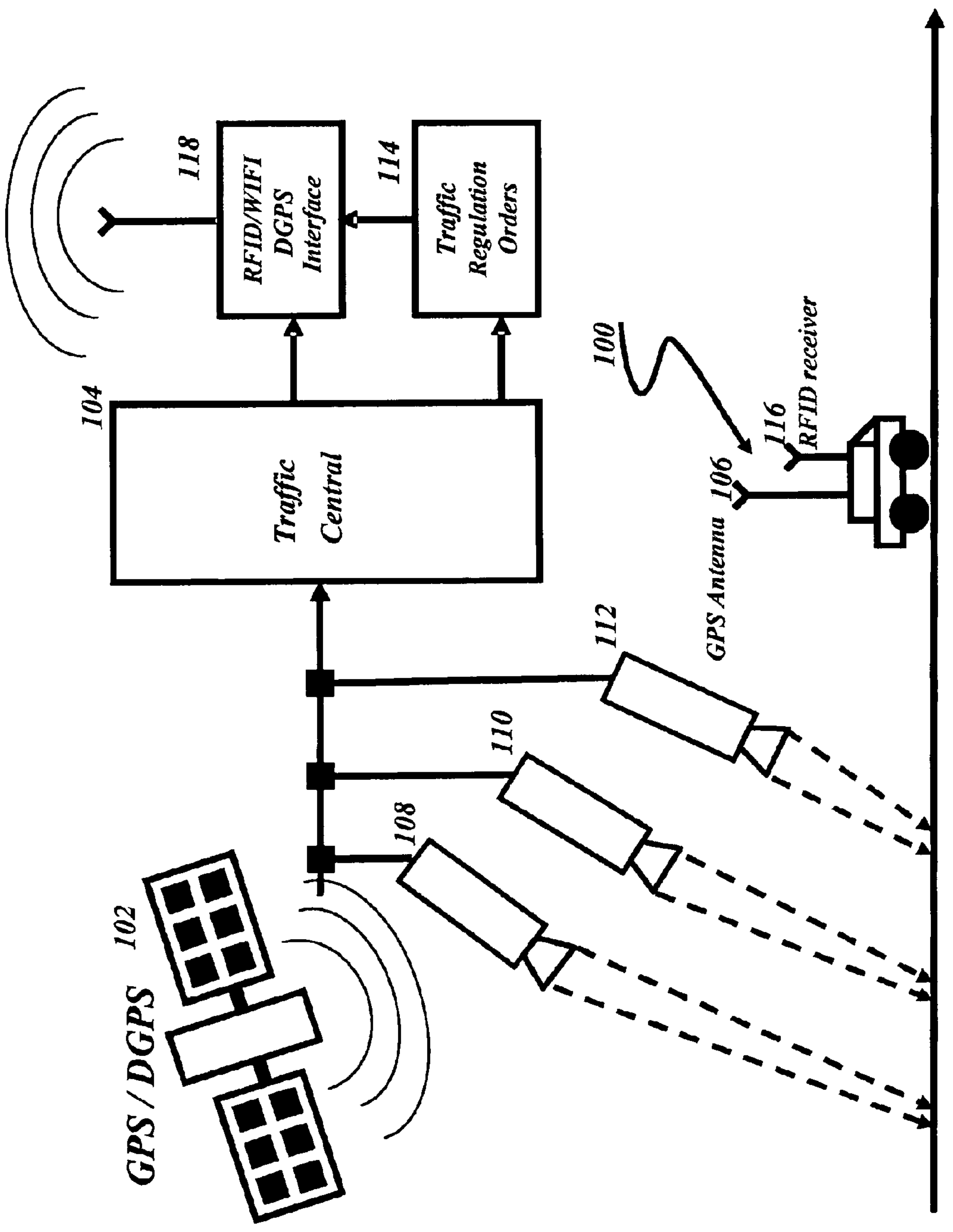
FIG. 1 is a general view of the speed regulation system of the present invention.

In the following description, numerous specific details are set forth to provide a thorough understanding of the present invention. However, it will be obvious to those skilled in the art that the present invention may be practised without such specific details. In other instances, well-known circuits may be shown in block diagram form in order not to obscure the present invention in unnecessary detail. For the most part, details concerning timing, data formats within communication protocols, and the like have been omitted in as much as such details are not necessary to obtain a complete understanding of the present invention and are within the skills of persons of ordinary skill in the relevant art.

The invention is implemented as an interactive traffic regulation system in a highway structure and uses existing installations.

Refer now to the drawings wherein depicted elements are not necessarily shown to scale and wherein like or similar elements are designated by the same reference numeral through the several views. The terms automobile, car, or vehicle may be used interchangeable to generally refer to a vehicle that travels on a highway. A communication protocol refers to all the characteristics necessary to communicate using the protocol, including power levels, frequencies, data formats, etc.

As shown on FIG. 1 a vehicle 100 is equipped with a Global Positioning System (GPS) receiver. The Global Positioning System, developed for the U.S. Department of Defense, allows anyone with a GPS receiver to identify his or her location on the earth's surface with a high degree of accuracy. The GPS receiver receives signals from a number of GPS satellites (only one is shown 102) in non-geosynchronous orbit around the earth. A minimum of three satellites' signals must be received for the GPS receiver to determine a geographical location. Fortunately, sufficient GPS satellites orbit the earth such that at any given time at any given location on the earth's surface, there are more than the requisite number of satellites within reception range.

From reading the signals of the GPS satellites, the GPS receiver determines the geographical location of the vehicle. This location is then used as a search key to retrieve a numerical speed limit from a database. In a first embodiment, the database may be located within the vehicle 100 and stored in a memory or on a storage device such as a CD-ROM, which may be periodically updated by the vehicle's operator or owner to match with the real-time road conditions modifications.

Alternatively, as shown on the figure, the database 104 may be stored in a remote location, in which case the vehicle requests speed limit information from the remote location by transmitting a request through an antenna 106 mounted to the vehicle. The remote location 104 receives the request through its own antenna (not shown) and responds with the proper speed limit information.

In yet another embodiment, the database may be located in the vehicle 100, but periodically updated by a remote location 104 transmitting an update signal through a broadcast antenna. The vehicle receives the update signal through its antenna and updates its database based on the update signal.

In any of the above embodiments and furthers alternatives to implement the principle of the present invention, the information provided may concern speed limit information but also road conditions information. As utilised within the invention, the term "road conditions" refers to many different types of conditions including, but not limited to, time of day, upcoming construction areas, upcoming traffic flow, weather conditions, road grades, distance to emergency exit ramps, road weight limits, shoulder widths and distances, and any other information which would be useful to a driver in order to more safely operate a vehicle.

The information received from the database is provided to a processor (not shown) within the vehicle. The processor receives the information and decodes it before instructing the driver with a resulting useful information for the roadway on which the vehicle is travelling. The information may be either presented to the user on a visual display, or as a voice audio, or as a combination of both.

Returning to FIG. 1, series of cameras (108,110,112) are mounted along a roadway to catch images of the traffic flow. The traffic flow information is received by a centralised traffic database 104 and analysed to deliver accurate traffic regulations orders 114 on displays posted all along the roadway.

The vehicle is further equipped with a RFID receiver 116 that allows to receive traffic information from the centralised traffic database 104. The traffic information is then used and combined with the GPS information within a car processing system to deliver personalised information to the driver and generate specific actions as will be detailed below with reference to FIG. 4.

Also shown on FIG. 1, is a communication interface block 118 compatible with the RFID communication protocols as well as with the WIFI, the GPS and DGPS communication protocols. The interface block allows the sending in real-time of the traffic information to the car to be processed by the car monitoring system for alerting the driver and/or regulating the car engine.

Figure 2:
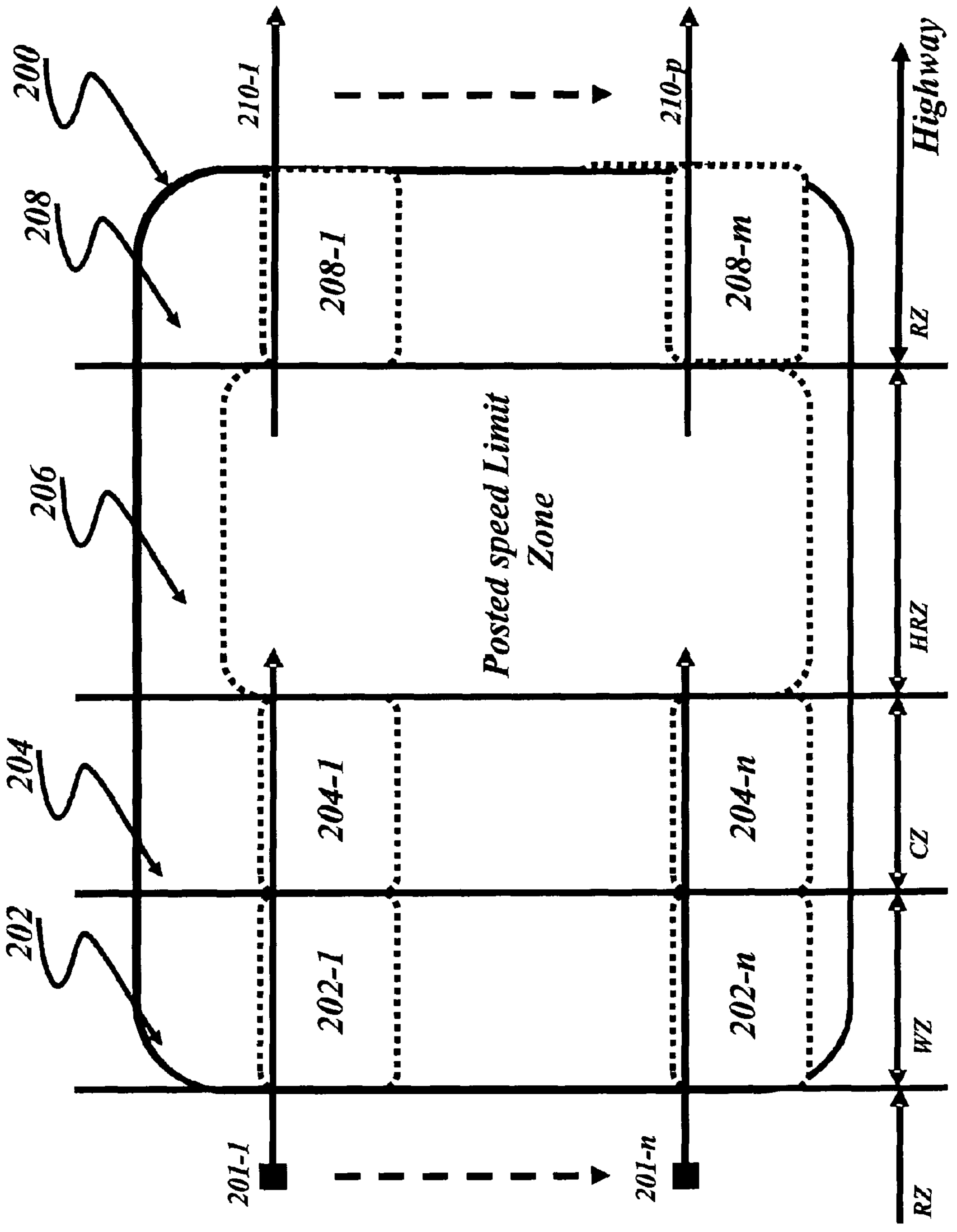
FIG. 2 shows a roadway division into risk levels according to the principle of the present invention.

Going now to FIG. 2, a virtual road division 200 into risk levels zones is now described. One may imagine a car driver being on its way to a urbanism zone. The road may comprise one or several lanes (201-1 to 201-*n*) and the vehicle is moving on one of them. The road is divided into at least four zones: a Warning zone (WZ) 202, a Critical zone (CZ) 204, a High Risk zone (HRZ) 206 and a Roadway zone (RZ) 208. Before reaching the High Risk zone, a vehicle crosses a Warning zone and then a Critical zone. The vehicle enters the speed controlled road section 200 coming from a previous Roadway zone and exits the speed controlled road section leaving the High Risk zone to enter a new Roadway zone. It is to be understood that the limit of the speed controlled section is beyond the frontier between the HRZ and a new RZ section. As illustrated the new roadway zone may include one or more lanes (208-1 to 208-*m*, m being equal or different to 'n') while a new speed controlled road section may include a different number of lanes (210-1 to 210-*p*, p being equal or different to 'm'). Each zone represents a specific road section for which a respective risk level is associated according to its proximity (i.e., distance) to the nearest posted speed limit which is at a location within the high risk zone. For each zone, a threshold speed value is associated to allow compliance of the current vehicle speed to the upcoming posted speed limit. Moreover, each threshold value may be dynamically adjusted depending on real-time events such as a traffic and road conditions.

It is to be appreciated that the threshold value associated to the High Risk zone is the posted speed limit, whereas the speed limits associated to the Warning zone and to the Critical zone are speed limits specifically defined to audit the driver behaviour in each zone before entering the High risk zone. The boundaries of each zone are defined by the watching area of each camera (108,110,112) posted along the roadway.

As shown on FIG. 2, the warning zone and the critical zone are divided into sub-areas (202-1 to 202-*n*; 204-1 to 204-*n*) that fit each to one in-lane width. It is to be understood that with the real-time monitoring system of the present invention, all the specific control parameters computed for a vehicle that is travelling from one lane to another, either within a same risk zone or not, are updated in real-time to be fully compliant with the new sub-area the vehicle is in.

The Warning Zone 202 is the low speed control layer zone. During travel of the WZ, the messages provided to the driver are information as regard to the car speed and the posted speed limit proximity to warn the driver.

The Critical Zone 204 is the last speed tolerance limit before entering the High Risk Zone. The messages provided to the driver are information as regard to the urgency of adapting the vehicle speed to the upcoming speed limit. Car engine regulation may be forced in order to respect the highway-code requirements. The car position as well as the associated speed together with the expected zone limitation are stored to be provided in case of necessity.

The High Risk Zone 206 represents the posted speed limit zone. Speed control system and highway code monitoring and driving rules can be associated to this zone in a conventional way. As exemplified in FIG. 2, the HRZ may be a urbanism zone where vehicles may travel on one lane.

When leaving the HRZ, the vehicle enters the Roadway Zone 208 wherein the car processing system is reset and set to the speed limitation allowed for the new road portion.

It is to be appreciated that each zone and sub-areas is configured to reflect the environmental structure in terms of speed limit and safety parameters. Traffic information is provided in real-time from the traffic central database to the car computer using the GPS or RFID or WiFi capabilities. The car computer decodes the information received and set up the appropriate actions as described above. Thus the system anticipates the driver attitude by analysing the way the vehicle is moving all along the road.

Furthermore the system allows to track the driver behaviour by storing the violations into a log file to be reported to the central using the in-car wireless facilities. The in-car memory (not shown here) restores the content of the log file and the worst case violations of the driver attitude are transmitted to the traffic central for control.

Figure 3:
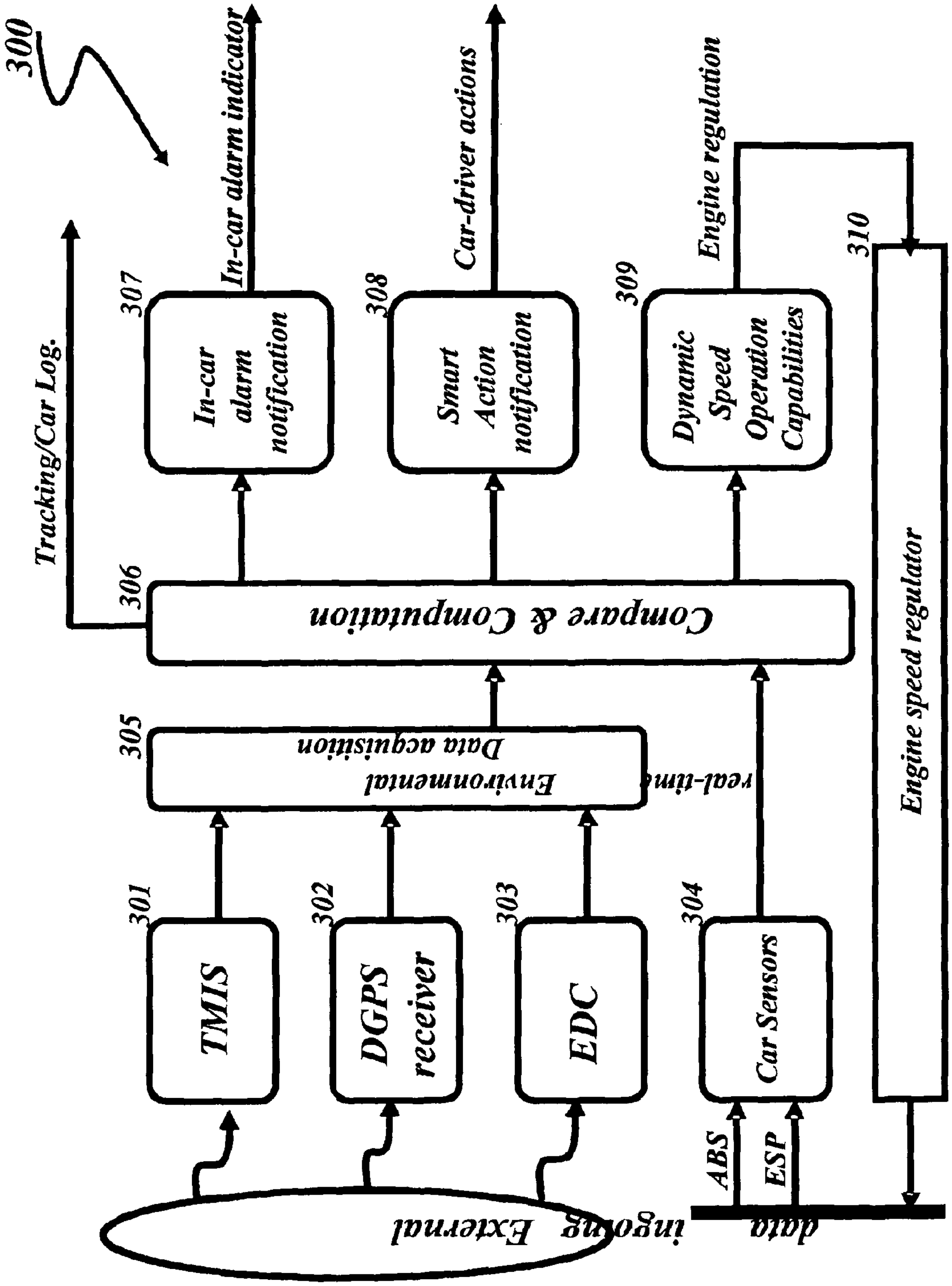
FIG. 3 is a high level functional block diagrams of the car speed regulation computing system.

FIG. 3 depicts in a high level, the functional blocks of the car speed regulation computing system 300 of the present invention. The apparatus is incorporated within vehicle 100 and provides a self regulated mechanism based on a combination of environmental data and vehicle data. A Traffic Monitoring Intelligent System (TMIS) 301 is coupled to a data acquisition block 305 and receives via the wireless facilities information related to the road conditions from the traffic central. This information is used to give recommendations to the car driver as to the required driving attitude in the current road context. These directives have to be treated in real-time. The TMIS decodes these information to be applied to the environmental data acquisition system of the car computer. The data acquisition block also receives the position inputs from the GPS (or DGPS) receiver 302.

Finally, the data acquisition block receives information issued from an Environmental Data Collection (EDC) block 303. The EDC catches from the central the data related to the predefined risk zones. Additionally, the EDC may receive punctually data provided by the RFID facilities instead of the wireless ones.

Then, the data acquisition block 305 senses the incoming data flow from the three upstream sources to provide a rotative arbitration to be transmitted to a ‘compare and compute’ block 306. The data acquisition block decodes the qualifiers included in the data flow to be further sampled and held by processing block 306.

Additionally, car speed sensors 304 allow to detect the current speed of the vehicle in a conventional way not further described here.

Thus, the present system allows to combine in a ‘compare and compute’ processing block 306 the information of the car position (from 302), the driving environmental rules (from 301 and 303), the car current speed (from 304) to determine the appropriate actions and notifications to be set according to the risk zone in which the vehicle is travelling.

An alarm notification block 307 is coupled to the output of the compare block 306 to generate an in-car alarm when set by an appropriate signal issued from the compare block.

An action notification block 308 is coupled to the output of the compare block 306 to generate an in-car driver message when set by an appropriate signal issued from the compare block.

A speed regulation block 309 is coupled to the output of the compare block 306 to generate a car engine regulation order to adapt the speed of the vehicle to the appropriate risk zone taking into account the real-time environmental conditions. It is to be appreciated that the engine regulation becomes effective only if the driver has activated an option of automatic speed regulation. Then, the speed regulation order allows an engine speed regulator 310 to adjust to the previously determined speed the current car speed.

Optionally, a Tracking/Car log message may be sent to the traffic central for traceability of the driver attitude. The tracking message contains in a log file the violations of the driver that is reported to the central for use in case of paramount necessity.

Figure 4:
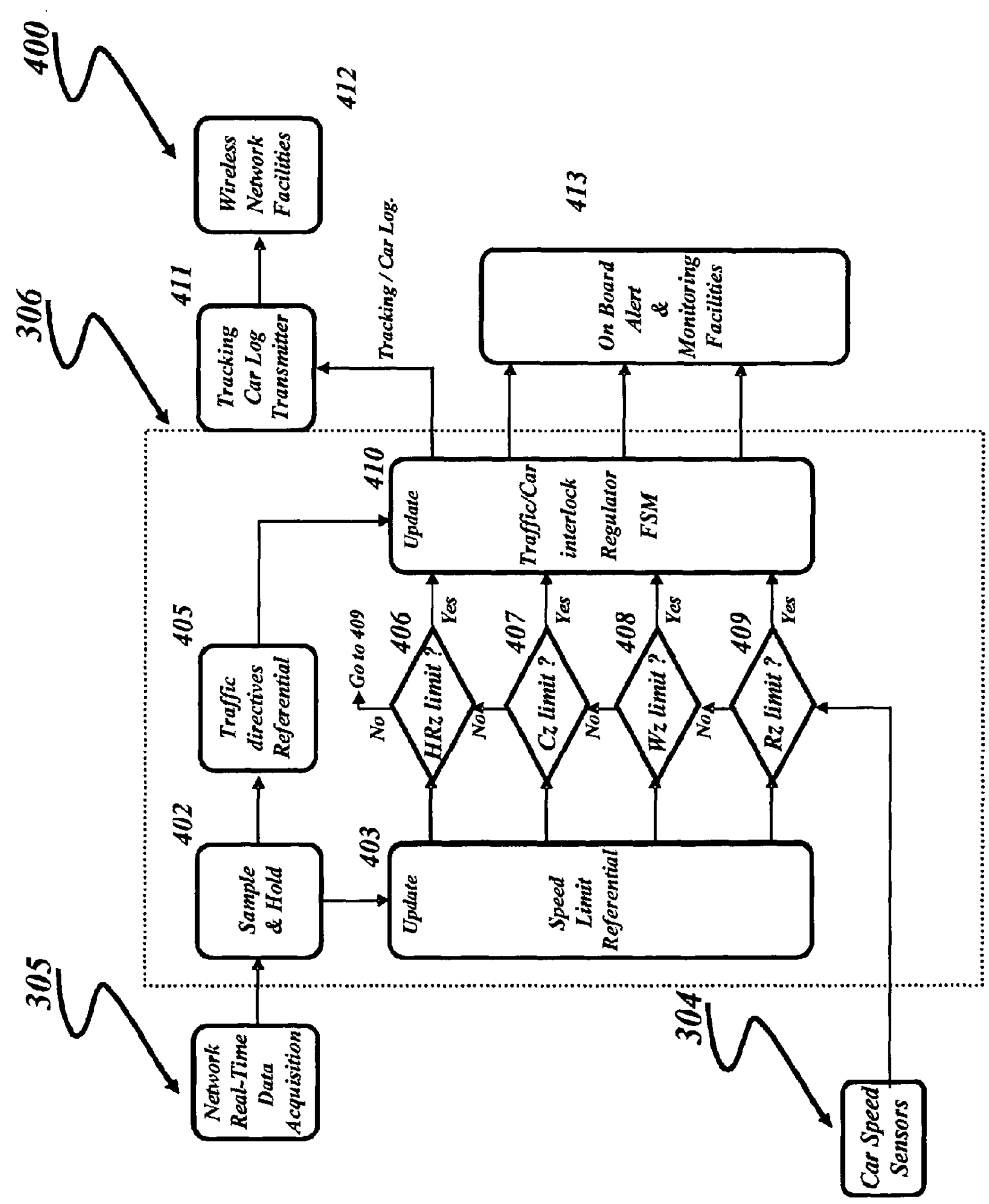
FIG. 4 is a flow chart of the main steps of the method to operate the system of the present invention.

Going to FIG. 4, a flow chart representation of the process of determining which message(s) and/or action(s) is/are to be generated is now described. The process starts at block 402 to sample at predefined intervals the data provided by the Data Acquisition block 305. Block 402 is preferably a ‘sample and hold’ circuit to hold the incoming data in a memory to be further used during a comparison phase. Block 402 delivers to block 403 the reference values of the risk zones (namely the RZ,WZ,CZ and HRZ ones) that represent the threshold speeds.

Block 402 further delivers to block 405 the remaining data sampled not related to vehicle speed. Block 405 allows to store the data received from block 402 to be further used as reference of road and traffic conditions.

As previously mentioned, the vehicle speed is determined by the car speed sensors 304 and is provided to comparator blocks 406, 407, 408 and 409 which also input respectively the thresholds references from block 403. It is important to note that the threshold value for each risk zone may be dynamically updated depending on the information received from the central traffic information and the traffic road circumstances.

A series of comparisons begins when the vehicle enters the first risk zone to determine whether the current speed of the vehicle is below the threshold value that corresponds to the current risk zone in which the vehicle is travelling. If the threshold speed limit is not exceeded for the current risk zone (branch No of the comparator 406 to 409 corresponding to the current risk zone), then the process iteratively cycles through all of the risk zones as shown, so long as the threshold speed limit is not exceeded (i.e., branch No results from each comparison). For example, if the current risk zone is the Warning Zone (WZ) at comparator 408, then the process iteratively cycles through all of the risk zones in a sequential order of WZ, CZ, HRZ, RZ, WZ, CZ, HRZ, RZ, . . . , so long as the threshold speed limit is not exceeded. If a threshold speed limit is exceeded for a particular risk zone (branch Yes of any of the comparators 406 to 409), then the process goes to block 410.

Block 410 is a Functional State Machine (FSM) which determines the appropriate directives to be delivered to block 413, based on the events and the condition coming from block 405 and comparator blocks 406 to 409.

For sake of clarity, block 413 is represented as one functional block grouping blocks 307, 308 and 309. According to the result of the FSM computation, the output of block 413 led to an alarm, a driver recommendation and/or an engine regulation.

Block 410 also feeds block 411 with tracking log files of the car events in regard to both the traffic directives and the driver attitude that are transmitted to the central using the wireless facilities as already mentioned. The Tracking/Car log message gives the traffic central the traceability of the driver attitude by pushing the different violations into a log file to be reported in case of paramount necessity.

Those skilled in the art will appreciate that the method and system of the present invention has been described for a preferred embodiment, but modifications and variations may be made to the above without departing from the scope of the invention.

The invention claimed is:

1. A method for monitoring speed of a vehicle moving in a speed controlled road section of a road, said vehicle having a computing system therein, said speed controlled road section comprising a plurality of risk zones, said plurality of risk zones comprising a high risk zone that includes a posted speed limit at a location in the high risk zone, said method comprising:

determining real-time road information pertaining to road conditions for each risk zone;

storing the determined road condition information in the computing system;

determining a threshold speed of the high risk zone as equal to the posted speed limit;

determining a threshold speed of each risk zone other than the high risk zone, based on the stored road condition information and on a distance from each risk zone other than the high risk zone to the location of the posted speed limit within the high risk zone;

storing the determined threshold speed of each risk zone in the computing system;

determining a geographical position of the vehicle while the vehicle is moving in the speed controlled road section;

storing the determined geographical position of the vehicle in the computing system;

determining a current risk zone of the plurality of risk zones in which the vehicle is moving, based on the stored geographical position of the vehicle;

determining a current speed of the vehicle moving in the current risk zone;

ascertaining that the current speed of the vehicle exceeds the stored threshold speed of a particular risk zone selected from the group consisting of the current risk zone and another risk zone of the plurality of risk zones; and responsive to said ascertaining, performing an action selected from the group consisting of triggering an alarm within the vehicle, presenting a message to a driver in the vehicle, automatically regulating the speed of the vehicle by the computing system, and combinations thereof, wherein the action is specific to the particular risk zone and dependent on the stored road condition information.

2. The method of claim 1, wherein the particular risk zone is the current risk zone.

3. The method of claim 1, wherein the particular risk zone is the another risk zone.

4. The method of claim 1, wherein each risk zone is a unique portion of the road defined by a watching area of an associated camera posted along the road.

5. The method of claim 1, wherein the road conditions consist of upcoming construction areas, upcoming traffic flow, road weather conditions, road grades, distance to emergency exit ramps, road weight limits, shoulder widths, and shoulder distances.

6. The method of claim 1, wherein the plurality of risk zones comprise a warning zone, a critical zone, the high risk zone, and a roadway zone appearing spatially along the road in a sequential order of the warning zone, the critical zone, the high risk zone, and the roadway zone.

7. The method of claim 6, wherein after said determining the current speed of the vehicle the method further comprises interactively cycling through a plurality of iterations such that each iteration preceding a last iteration of the plurality of iterations comprises determining that the current speed of the vehicle does not exceed the threshold speed of the warning zone, the threshold speed of the critical zone, the threshold speed of the high risk zone, and the threshold speed of the roadway zone, and wherein the last iteration comprises said ascertaining such that the particular risk zone is the warning zone, the critical zone, the high risk zone, or the roadway zone.

8. The method of claim 6, wherein the particular risk zone is the warning zone, wherein the action comprises presenting the message to the driver, and wherein the message comprises information pertaining to the current speed of the vehicle and the distance from the vehicle to the location of the posted speed limit within the high risk zone to warn the driver.

9. The method of claim 6, wherein the particular risk zone is the critical zone, wherein the action comprises presenting the message to the driver, and wherein the message comprises information pertaining to an urgency of changing the current speed of the vehicle in consideration of the posted speed limit.

10. The method of claim 6, wherein the particular risk zone is the critical zone, wherein automatic speed regulation is activated in the vehicle, wherein the action comprises automatically regulating the current speed of the vehicle by the computing system in consideration of the posted speed limit.

11. The method of claim 6, wherein the current risk zone is the roadway zone, wherein automatic speed regulation is activated in the vehicle, and wherein the method further comprises automatically setting the current speed of the vehicle by the computing system in consideration of a vehicle speed limit of the roadway zone.

12. The method of claim 6, wherein the warning zone, the current risk zone and the critical zone each consist of n lanes, wherein the roadway zone consists of m lanes, wherein n and m are each at least 1, and wherein m is unequal to n.

13. The method of claim 6, wherein the method further comprises:

storing a record in a log file of the computing system that the current speed of the vehicle exceeds the stored threshold speed of the particular risk zone; and after said storing the record in the log file, wirelessly transmitting the record to a traffic central database located external to the vehicle.

14. The method of claim 1, wherein the method further comprises:

storing a record in a log file of the computing system that the current speed of the vehicle exceeds the stored threshold speed of the particular risk zone; and after said storing the record in the log file, wirelessly transmitting the record to a traffic central database located external to the vehicle.

15. The method of claim 1, wherein the risk zones are sequenced in a direction of travel by the vehicle on the road such that a boundary between the risk zones in each pair of successive risk zones is perpendicular to the direction of travel by the vehicle on the road.

16. An apparatus comprising a computing system in a vehicle, said computing system comprising a processor and a computer readable storage medium having program code stored therein, said program code configured to be executed by the processor to implement a method for monitoring speed of the vehicle moving in a speed controlled road section of a road, said speed controlled road section comprising a plurality of risk zones, said plurality of risk zones comprising a high risk zone that includes a posted speed limit at a location in the high risk zone, said method comprising:

determining real-time road information pertaining to road conditions for each risk zone;

storing the determined road condition information in the computing system;

determining a threshold speed of the high risk zone as equal to the posted speed limit;

determining a threshold speed of each risk zone other than the high risk zone, based on the stored road condition information and on a distance from each risk zone other than the high risk zone to the location of the posted speed limit within the high risk zone;

storing the determined threshold speed of each risk zone in the computing system;

determining a geographical position of the vehicle while the vehicle is moving in the speed controlled road section;

storing the determined geographical position of the vehicle in the computing system;

determining a current risk zone of the plurality of risk zones in which the vehicle is moving, based on the stored geographical position of the vehicle;

determining a current speed of the vehicle moving in the current risk zone;

ascertaining that the current speed of the vehicle exceeds the stored threshold speed of a particular risk zone selected from the group consisting of the current risk zone and another risk zone of the plurality of risk zones; and responsive to said ascertaining, performing an action selected from the group consisting of triggering an alarm within the vehicle, presenting a message to a driver in the vehicle, automatically regulating the speed of the vehicle by the computing system, and combinations thereof, wherein the action is specific to the particular risk zone and dependent on the stored road condition information.

17. The apparatus of claim 16, wherein the particular risk zone is the current risk zone.

18. The apparatus of claim 16, wherein the particular risk zone is the another risk zone.

19. A computer program product comprising a computer readable storage medium having a program code stored therein, said program code configured to be executed by a processor of a computing system within a vehicle to implement a method for monitoring speed of the vehicle moving in a speed controlled road section of a road, said speed controlled road section comprising a plurality of risk zones, said plurality of risk zones comprising a high risk zone that includes a posted speed limit at a location in the high risk zone, said method comprising:

determining real-time road information pertaining to road conditions for each risk zone;

storing the determined road condition information in the computing system;

determining a threshold speed of the high risk zone as equal to the posted speed limit;

determining a threshold speed of each risk zone other than the high risk zone, based on the stored road condition information and on a distance from each risk zone other than the high risk zone to the location of the posted speed limit within the high risk zone;

storing the determined threshold speed of each risk zone in the computing system;

determining a geographical position of the vehicle while the vehicle is moving in the speed controlled road section;

storing the determined geographical position of the vehicle in the computing system;

determining a current risk zone of the plurality of risk zones in which the vehicle is moving, based on the stored geographical position of the vehicle;

determining a current speed of the vehicle moving in the current risk zone;

ascertaining that the current speed of the vehicle exceeds the stored threshold speed of a particular risk zone selected from the group consisting of the current risk zone and another risk zone of the plurality of risk zones; and responsive to said ascertaining, performing an action selected from the group consisting of triggering an alarm within the vehicle, presenting a message to a driver in the vehicle, automatically regulating the speed of the vehicle by the computing system, and combinations thereof, wherein the action is specific to the particular risk zone and dependent on the stored road condition information.

20. The computer program product of claim 19, wherein the particular risk zone is the current risk zone.

* * * * *